US009836989B2

(12) United States Patent
Wenger et al.

(10) Patent No.: US 9,836,989 B2
(45) Date of Patent: Dec. 5, 2017

(54) TRAINING DATA MANAGEMENT METHOD AND RELATED SYSTEM

(75) Inventors: Jason C. Wenger, Cedar Rapids, IA (US); Jaclyn A. Hoke, Marion, IA (US); Brian R. Wolford, Cedar Rapids, IA (US); Alex Postnikov, Cedar Rapids, IA (US); James N. Potts, Cedar Rapids, IA (US); Alex W. Halfpenny, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 13/608,367

(22) Filed: Sep. 10, 2012

(65) Prior Publication Data

US 2013/0323687 A1 Dec. 5, 2013

Related U.S. Application Data

(60) Provisional application No. 61/655,903, filed on Jun. 5, 2012, provisional application No. 61/655,917, filed on Jun. 5, 2012.

(51) Int. Cl.
*G09B 9/02* (2006.01)
*G09B 9/08* (2006.01)

(52) U.S. Cl.
CPC ......... *G09B 9/08* (2013.01); *G09B 9/02* (2013.01)

(58) Field of Classification Search
CPC . G09B 9/08; G09B 9/003; G09B 7/02; G09B 9/12; G09B 9/44; G09B 9/54;
(Continued)

(56) References Cited

U.S. PATENT DOCUMENTS 4,057,913 A * 11/1977 Eisenberg .................. 434/6
5,587,904 A * 12/1996 Ben-Yair .................. F41G 3/04
342/357.25

(Continued)

FOREIGN PATENT DOCUMENTS

| CN | 101192064 A | 6/2008 |
| CN | 102356417 A | 2/2012 |
| CN | 102571741 A | 7/2012 |

OTHER PUBLICATIONS

Filippidis et al., Investigating the Quality of Service of Current and Future Tactical Information Exchanges—Net Warrior, May 2010, DSTO Defence Science and Technology Organisation.*

*Primary Examiner* — Eddy Saint-Vil
(74) *Attorney, Agent, or Firm* — Angel N. Gerdzhikov; Donna P. Suchy; Daniel M. Barbieri

(57) ABSTRACT

A training data management method and related system is disclosed comprising three integrated elements. A training data network may provide a network linking a remote instructor operating an off-board data network with a student operating an onboard data network. The remote instructor may, via the datalink connection, maintain a level of control of the data set available to the student. A method for providing training data may include an onboard and off-board safety monitor configured for perceiving a safety event and sending a notification thereof to an involved participant. A system for providing training data may include a data guard configured to monitor all communications between two networks and block sensitive information, training data, and classified communications between the networks.

20 Claims, 5 Drawing Sheets

(58) Field of Classification Search
CPC ...... G09B 19/165; G09B 19/167; G09B 9/00; G09B 9/02; G06F 11/324; G06F 17/30241; G06Q 10/00; G06Q 50/26; G08B 21/06; G06K 9/00; F41G 3/04
USPC .......... 434/6, 29, 30, 35; 709/201, 203, 240; 703/2; 715/788
See application file for complete search history.

(56) References Cited

U.S. PATENT DOCUMENTS

| | | | |
|---|---|---|---|
| 5,807,109 | A | 9/1998 | Tzidon et al. |
| 7,099,752 | B1 * | 8/2006 | Lenell .................. G05D 1/0027 244/189 |
| 7,509,434 | B1 * | 3/2009 | Crosmer et al. ............. 709/240 |
| 7,779,449 | B2 | 8/2010 | Pham |
| 8,140,611 | B1 | 3/2012 | Miller et al. |
| 8,616,883 | B2 * | 12/2013 | Wokurka ................. G09B 9/16 434/30 |
| 8,616,884 | B1 * | 12/2013 | Lechner et al. ................ 434/35 |
| 8,986,011 | B1 * | 3/2015 | Sowadski ............. G09B 9/301 434/29 |
| 2003/0215771 | A1 * | 11/2003 | Bartoldus ................ G09B 9/00 434/14 |
| 2004/0210847 | A1 * | 10/2004 | Berson et al. ................ 715/788 |
| 2006/0178758 | A1 * | 8/2006 | Koriat ............................ 700/12 |
| 2006/0236365 | A1 | 10/2006 | Pham |
| 2007/0100589 | A1 * | 5/2007 | Farr et al. ......................... 703/2 |
| 2007/0236366 | A1 * | 10/2007 | Gur ......................... G06K 9/00 340/945 |
| 2007/0264617 | A1 * | 11/2007 | Richardson et al. ............ 434/30 |
| 2008/0120366 | A1 * | 5/2008 | Donovan et al. ............. 709/203 |
| 2008/0235318 | A1 * | 9/2008 | Khosla et al. ................ 709/201 |
| 2010/0003652 | A1 * | 1/2010 | Lavie et al. .................. 434/219 |
| 2011/0023132 | A1 * | 1/2011 | Jelavic et al. .................. 726/30 |
| 2012/0036445 | A1 | 2/2012 | Ganille et al. |
| 2012/0075122 | A1 * | 3/2012 | Whitlow et al. .............. 340/963 |
| 2012/0308964 | A1 * | 12/2012 | Voorhees et al. .............. 434/29 |

* cited by examiner

TRAINING DATA MANAGEMENT METHOD AND RELATED SYSTEM

RELATED APPLICATIONS

The present application claims the benefit of U.S. Provisional Application No. 61/655,917 filed on 5 Jun. 2012 entitled "TRAINING DATA MANAGEMENT METHOD AND RELATED SYSTEM" and U.S. Provisional Application No. 61/655,903 filed on 5 Jun. 2012 entitled "EMBEDDED SIMULATOR METHOD AND RELATED SYSTEM" both of which are hereby incorporated by reference in their entirety. Also, the present application is related to U.S. patent application Ser. No. 13/608,271 filed on 10 Sep. 2012 entitled "EMBEDDED SIMULATOR METHOD AND RELATED SYSTEM" which is hereby incorporated by reference in its entirety.

FIELD OF THE INVENTION

The present invention relates generally to management of training data presented to a trainee. More particularly, embodiments of the present invention relate to a computerized method and system for selectively determining a data set to present to a trainee ensuring a safe and effective training scenario.

BACKGROUND OF THE INVENTION

Training may be the basis upon which desired performance may depend. Enhancement of a training scenario may be a constant and desired goal of a training entity. A trainee may perform better in a future encounter with a scenario if the trainee has had previous experience with a similar scenario. Creation of a particular scenario may be difficult and expensive. For example, in training a Captain of a ship, the trainee/Captain may benefit from experience with a scenario involving a second ship from which the trainee/Captain must maneuver to avoid. To create a scenario involving two actual ships on a collision course may be prohibitively expensive as well as unsafe for the training entity charged with education of the trainee/Captain.

Many platforms may communicate information to an operator via a data display or other visual or aural indicator. For example, the Captain of the ship may reference a radar display from which he may determine a possible course of action to take to avoid a collision. Each user interface may communicate with the user in a specific way offering data to the user beneficial to operation of the platform. The Captain may visually reference a radar display, the Captain may aurally perceive a collision warning, and the Captain may visually perceive a flashing beacon on the horizon. All of these queues may provide an input to the decision the Captain may make.

Live training scenarios may provide the best possible training environment for a trainee. A trainee who has experienced an event in a real world training environment may subsequently perform more productively than if the trainee had not experienced the training event. Actual presence in the aircraft, flying through airspace, may add an increased aspect of positive stress to the training environment. For example, a wingman may practice a maneuver to position his aircraft for weapons employment as the flight lead aircraft makes a visual identification of a target. Having performed this maneuver numerous times in an actual fighter aircraft, the wingman may perform more productively in a combat scenario than if the wingman had not previously practiced the maneuver.

Live training scenarios using actual assets may have become increasingly expensive. The cost of one flight hour of an F/A-18E Super Hornet has risen dramatically in past years.

Simulation has found success in a variety of training scenarios. The cost of simulating a scenario may be a fraction of the cost of actually creating the same Live training scenario. Quality of simulation has been enhanced with computer generated graphics, computer generated threats, and integrated simulations.

Simulation of information communicated to an operator may be presented to the operator via the various indicators. For example, the training entity may present the ship's Captain a simulation of a radar display on which the Captain may base a decision. This simulation may be accomplished without the use of an actual ship. Radar displays, communications heard by the trainee, threats posed to the trainee, and consequences for each action taken by the trainee may all be generated by a computer device.

A variety of prior art methods of hybrid simulation have been used to effectively integrate a Virtual entity into a Live training scenario. One example of this integration includes Live Virtual Constructive (LVC) training that has evolved to enable multi-platform integration in a training scenario. LVC may include Live assets (such as an actual aircraft flying on a weapons range), Virtual assets (such as a pilot operating a simulator at a ground-based location), and Constructive assets (those objects generated and operated by an algorithm on a computer device).

Connectivity to ensure effective presentation to an operator may pose a challenge to successful integrated LVC simulation. In order for the operator to reference a presentation, the operator must have the presentation available to him. On an aircraft, this means an effective datalink capable of transmission of data to not only a single aircraft, but to an entire large force exercise of fighter and adversary aircraft, tanker and remote sensing aircraft, ground stations, and space based assets.

A datalink capable of multi-platform and multi mission connectivity may include such factors as Quality of service (QOS), number of participants, bandwidth allocation per participant, available spectrum, and usefulness in consideration of the rules of the geographic area in which an entity may operate.

Current Datalink Protocols may be ineffective when applied to such a connectivity requirement. Prior art protocols may offer fixed sized messages, with no guarantee of message delivery. Others may offer no guarantee of delivery in the order sent, or a fixed number of slots allocated to each communicator. Some may offer package delivery in a specific order but this order guarantee may limit speed of delivery. Other protocols may offer variable size payloads with variable bandwidth requirements. These protocols may sacrifice one characteristic to perform more effectively within a second characteristic. For example, a datalink protocol may guarantee delivery of a size limited message. Most protocols maintain a limited connectivity considering all desired characteristics of the datalink. However, when communication may be a requirement for safe and effective operation, these protocols may fall short of the desired requirement.

Training situations may require accurate presentations to an operator to retain training value. In some sessions, training data may be displayed alongside actual data. Uncorrelated simulated data presented alongside actual data may create an unintentional presentation. Correlation of the training data and the actual data to create a presentation as intended by a training entity may add value to the training environment.

Simulation may be one valuable tool usable by an instructor to cost effectively train a student. However, simulation data displacing actual critical data may diminish student situational awareness and lead to diminishing levels of safety. An operator confused about which data may be simulated and which data corresponds to actual events may adversely affect the level of safety of the operator and those in proximity with the operator.

Safety may be one goal of the training entity. On occasion, a training entity may offer training in a dangerous activity. As a trainee may base decisions on the information provided, the trainee may be placed in a situation where an incorrect decision may lead to an unrecoverable situation.

To further the goal of safety, an instructor may desire to observe the same display that the trainee is referencing. Traditionally, an instructor may be physically present in the same location as the trainee, the instructor able to observe the same or a similar display and add input to the training scenario. Further, an instructor may be located remotely, able to observe the trainee through a datalink capable of providing a display similar to the display referenced by the trainee. These remote information presentations may, however, suffer from inaccuracies concerning timeliness of data, indications of information, software and hardware compatibility, and ultimately a degradation of instructor capability.

Simulation technology and the integration of simulation with live training may be a means to increase training opportunities and thereby increase crew readiness. While integration of virtual and constructive elements into live training may open up new training avenues, it also raises concerns about operational safety.

Security of information contemporaneously presented to multiple operators may be a further goal of the training entity. On occasion, information presented to a trainee may be of sensitive nature where the training entity may desire only certain trainees receive the information. Separate platforms may be of separate classification. For example, in a multi-national large force exercise with participants from a variety of countries and security clearance levels, the training entity may desire limited information delivery to some, or a majority of, participants.

During distributed training LVC exercises, it may be common to have multiple datalink streams sending and receiving data from a single platform so that one datalink may be dedicated to training data and the other datalink dedicated to (potentially classified) tactical communication. A possibility exists that training data could enter a tactical datalink, and vice-versa, resulting in a potential safety concern, a violation of a rule of engagement, and dissemination of classified information to unauthorized participants.

Considering the variety of datalink protocols, limited training budget challenges, safety priorities, and security requirements, the training entity may desire a functional enhancement to current methods and systems for training data management.

Therefore, a method and related system offering precise management of training scenarios by efficient transmission and reception of training data to and from a remote instructor where reproduction of an accurate data set at a remote location may more efficiently train a student. Further, determining a training safety event requiring intervention then actually intervening in the scenario to maintain a level of safety while selectively determining a data set to present to a trainee may be of particular importance to the training entity.

SUMMARY OF THE INVENTION

Accordingly, a preferred embodiment of the present invention is directed to a training data network comprising: an onboard data network configured for reception and presentation of primary operational data and selective presentation of training data, an off-board data network configured for at least one of: reception and presentation of the primary operational data, generation of the training data, transmission of a signal to determine the selective presentation of the training data, and transmission of the training data, a datalink operably coupling the onboard data network with the off-board data network, the datalink configured for at least one of: receiving the primary operational data, transmitting the primary operational data to the off-board data network, receiving the training data, transmitting the signal to determine the selective presentation of the training data, and transmitting the training data to the onboard network.

A further embodiment of the present invention is directed to a method for providing training data comprising: receiving simulated training data, presenting the simulated training data to an onboard data network, receiving a notification of a safety event, preempting, with no action by an onboard operator, presentation of the simulated training data in response to the receiving.

A further embodiment of the present invention is directed to a system for providing training data comprising: a training data generation system, a training data presentation system, an onboard object tracking sensor, an object tracking network, a data guard operably coupling the training data generation system and the object tracking network, the data guard configured for preventing at least partial transmission and reception of at least one of: training data to the object tracking network, object tracking data to the training data generation system and the training data presentation system, and data from a first network to a second network.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

As used herein, embodiments of the present invention may relate to aircraft training in an airborne scenario. It is contemplated an aircraft may be one of many platforms on which the systems and methods described herein may be configured to operate. The current disclosure may be tailored to operate on any moving or stationary platform or object presentation device for which simulation may be desired. Criticality of data may provide a simulator instructor with needed tools for training. Hierarchy of data may allow a simulator to selectively display data for a productive simulation experience.

Training Data Network

Figure 1:
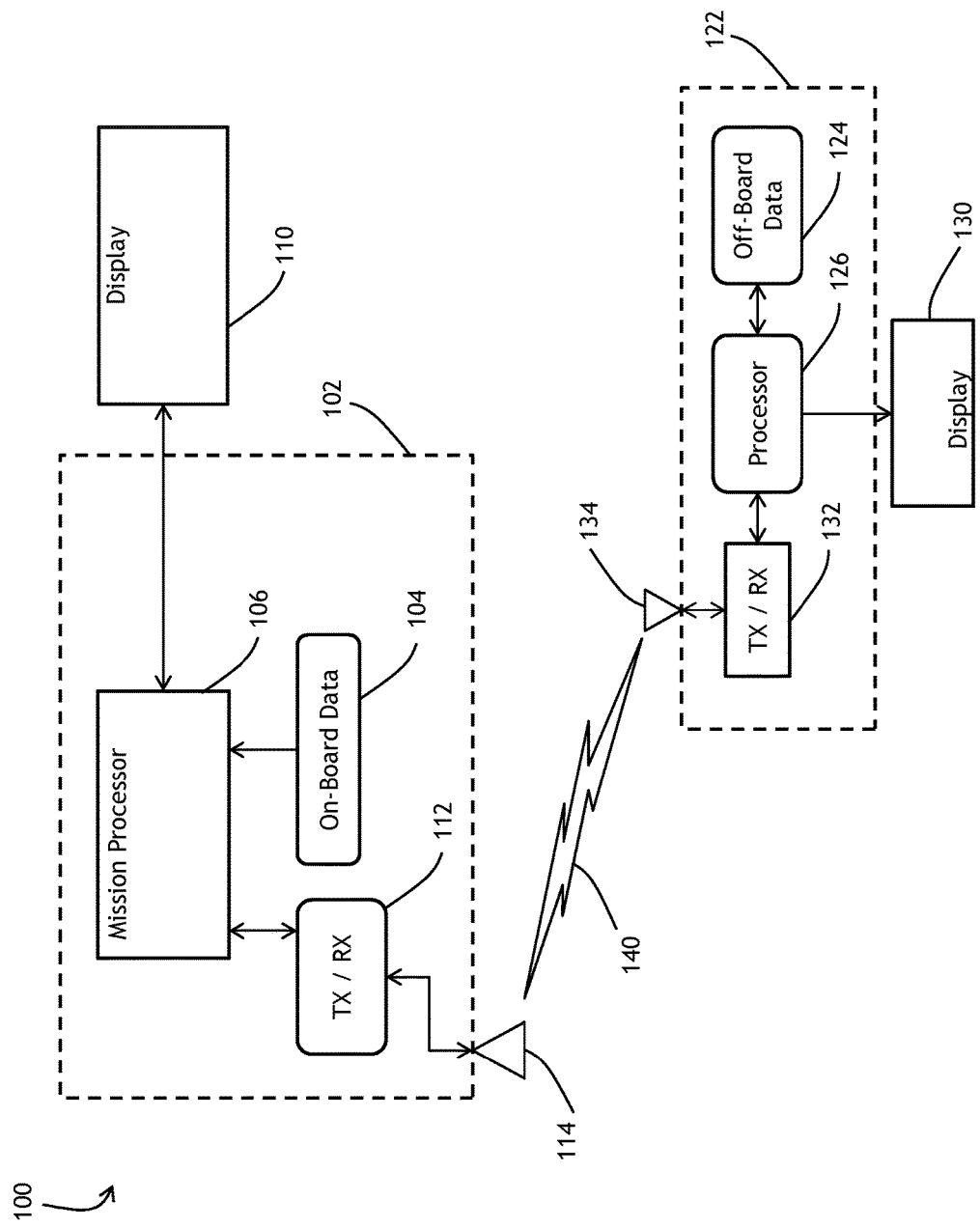
FIG. 1 is a diagram of a training data network in accordance with a preferred embodiment of the present invention.

Referring to FIG. 1, a diagram of a training data network in accordance with a preferred embodiment of the present invention is shown. A training data network may comprise onboard hardware coupled with off-board hardware via a datalink 140. The training data network 100 may provide a mechanism for transmission and reception of primary operational data (or a defined subset thereof) over datalink 140 to and from an off-board data network 122 located at a remote station. For example, a training data network may comprise a remote instructor at the remote station able to view an exact presentation of the view a student may see while operating the onboard data network 102.

An onboard data network 102 may be configured to transmit and receive data via a datalink 140 and present data to an onboard operator via a display 110. The onboard data network may preferably comprise an antenna 114 configured to receive data from a datalink 140, transmitter receiver 112 for configuring data for the onboard data network 102, mission processor 106, an onboard data source 104, and a display 110.

The remote instructor may operate the off-board data network 122 with software having identical formats as those on the onboard data network 102. For example, an instructor operating an off-board data network 122 on the ground may see the exact picture a student operating onboard data network 102 may experience while flying an actual aircraft. Preferably, the primary operational data may be in an ARINC 661 format in operation on the aircraft. While an ARINC Graphics Server AGS may be processing the ARINC 661 data onboard the aircraft, software in the off-board data network 122 may provide the exact display as onboard.

The off-board data network 122 may be configured to transmit and receive data via the datalink 140 with the onboard data network 102. Hardware comprising an off-board data network 122 may preferably include an antenna 134, transmitter receiver 132, processor 126, off-board data source 124, and display 130.

As the onboard data network 102 may transmit the primary operational data to the remote station operating the off-board data network 122, the datalink 140 connecting two networks may comprise a plurality of forms.

As datalink requirements may often vary depending on the training scenario and site, the present invention may be configured for datalink agility. It is contemplated the present invention may integrate multiple types of datalink systems, operating on diverse radios, alternative waveforms and bandwidths, and within multiple frequency bands, with link capabilities varying from full TCP/IP connectivity to narrowband, time-slice allocated, fixed-sized packets. These various types of datalink may be integrated through a plurality of installation systems. A first installation system may include Ethernet and power connections brought to an access cover location on a platform 210, allowing for installation of various datalink required hardware and associated antenna requirements, each system may be preferably pre-mounted on one of a set of interchangeable cover plates allowing for ease of change to an additional requirement. Alternatively, a connectivity node for a datalink may be incorporated into a well-known external pod configured for attachment to an existing weapons station. One attachment method may include a set of engineered launcher rail adaptors fitted for either single or paired training pods conforming to the AIM-9 form factor on an aircraft's original wing pylons.

The primary operational data set transmitted by the onboard data network 102 may be a subset of the entire primary operational data used by the onboard data network 102. Such subset may comprise data necessary for an operator to effectively operate a vehicle and be less burdensome on the datalink 140 requirements for transmission and reception. For example, a subset of data configured for transmission may include such parameters such as airspeed, altitude, heading, attitude, and position. As training scenarios may be dynamic in nature, it is contemplated the subset of data sent to the off-board data network 122 may be dynamic as well.

Additionally, training data network 100 may be configured for transmission of simulated training data from the off-board data network 122 to the onboard data network 102. For example, such simulated training data may include a simulated threat external or internal to the aircraft. An exemplary internal threat may be a simulated oil pressure malfunction requiring specific action taken by the operator. An exemplary external threat may include a hostile target against which the operator may be required to take specific action within a set of training rules or within a set of rules of engagement.

For example, a remote instructor may employ the training data network to create an ARINC 661 event at the remote station operating the off-board data network 122. The training data network 100 may then transmit the ARINC 661 event to the onboard data network 102 via the datalink 140 to allow a level of control of the aircraft displays 110 from the ground. This remote instructor may be particularly relevant to single seat aircraft where there is not instructor station onboard the aircraft for the instructor to accompany the trainee. The training data network 100 may allow earlier trainee entry into a live training session while allowing the instructor to closely monitor the exercise and mitigate risks.

Training Safety Monitor

Figure 2:
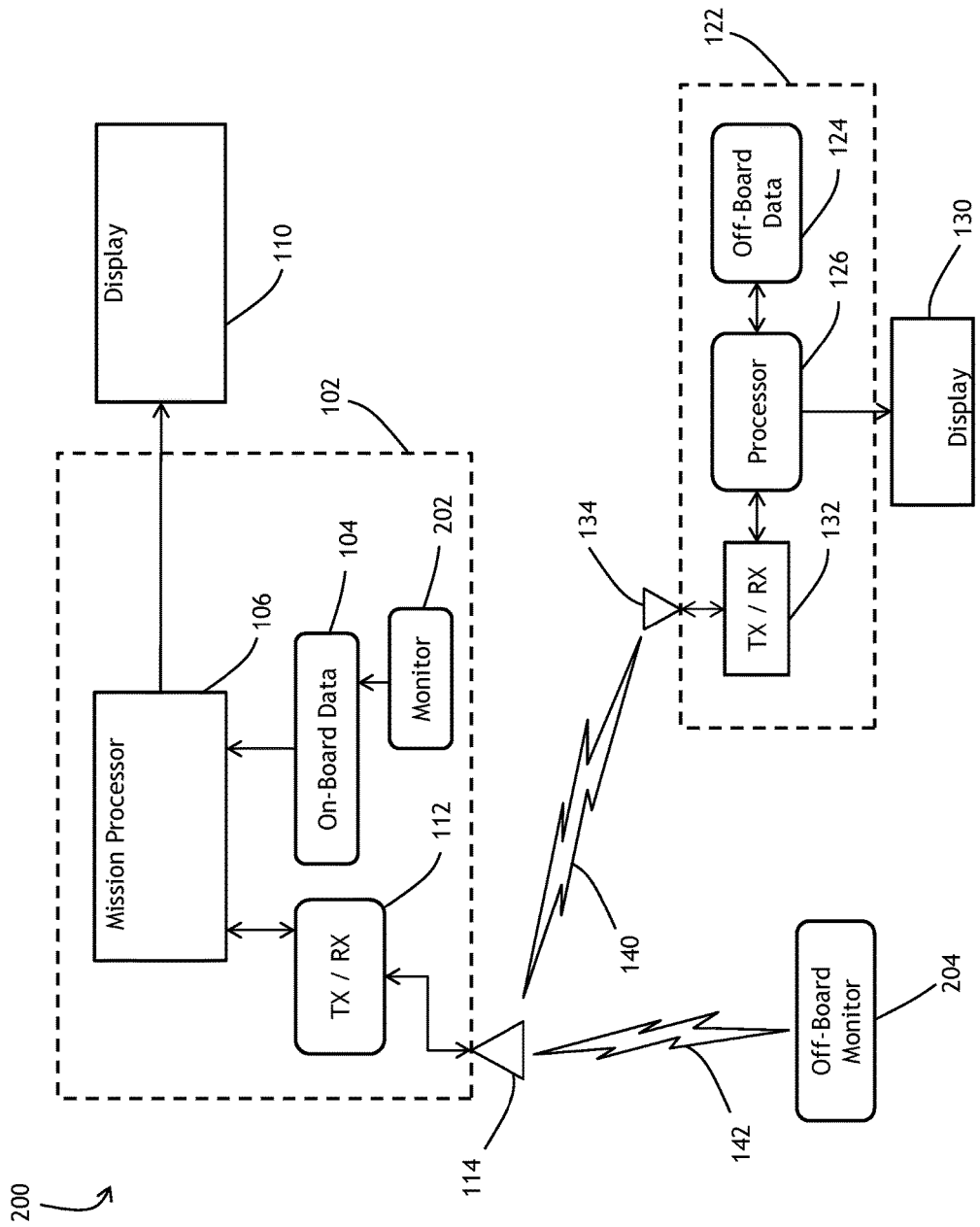
FIG. 2 is a diagram of an onboard and off-board monitor in accordance with a preferred embodiment of the present invention.

Referring to FIG. 2, a diagram of an onboard and off-board monitor in accordance with a preferred embodiment of the present invention is shown. Method 200 may operate upon training data network 100. Method 200 may include an onboard monitor 202 and an off-board monitor 204. Onboard and off-board monitors may function to preclude display of simulated training data should a safety event occur.

The onboard monitor 202 may preferably function to monitor onboard systems for a malfunction or critical parameter designated as a safety event. An onboard system requiring constant monitoring may include systems for which safety of operation is critical. For example, an engine fire onboard an aircraft may be a critical safety event during which a training entity may desire all simulated training data be removed from an onboard display 110. Similarly, a loss of control of the aircraft may be a situation requiring immediate operational attention from the pilot to input proper controls to regain controlled flight.

During these critical operational events, the training entity may desire (and an operator may require) the simulated training data be precluded from trainee perception. Once the onboard monitor 202 receives the indication of the safety event, the onboard monitor 202 may send a notification of a safety event to the operator. It is contemplated the notification of a safety event may be sent via the datalink 140 142 to additional stations for additional assistance. The notification of a safety event may be in the form of a visual alert on a display 110 indicating a commonly used phrase such as Knock-It-Off (KIO), a lighted warning such as a master caution or master warning light, and an aural indication of well-known voice prompt system in use on many aircraft.

The off-board monitor 204 may preferably communicate with the onboard data network 102 via datalink 142. It is contemplated the off-board monitor 204 may comprise an entity solely charged with operational safety. For example, an off-board monitor 204 may be a Range Control Office (RCO) located at a remote ground station. The RCO may exist solely for safety of the participants operating in designated airspace or an air-to-ground range. The RCO may visually perceive an imminent collision between two aircraft and send a timely notification of a safety event to each of the aircraft. Further, in training many training entities publish a set of training rules, violation of which may result in a removal of the violator from the exercise. A remote RCO at an off-board monitor 204 may perceive a violation of the training rules and thus, send the notification of a safety event to each violator along with an order to return to base.

An instructor operating off-board data network 122 may also be a source of a notification of a safety event. Such instructor may perceive a safety event long before student perception and thus, alert the student to the event. For example, and instructor operating off-board data network 122 may perceive an aircraft in a nose low situation in mountainous terrain. Once the instructor perceives the situation, the instructor may send the notification of a safety event via datalink 140 to the student operating the onboard data network 102. The student may then perceive the KIO signal and react accordingly.

The preferred notification of a safety event may include, but is not limited to, any individual or combination of: visual alerts, auditory alerts, an exit from a training mode, and removal of any training data from the displays. Visual and/or auditory alerts may further increase in frequency, duration, volume, etc. and if necessary even inhibit training modes as long as unsafe conditions persist.

Because the notification of a safety event is time-critical, is may be assigned the highest priority by the datalink and datalink infrastructure. For example, routine positioning data currently being transmitted via the datalink 140 may be inhibited during transmission of a notification of a safety event.

Data Guard

Figure 3:
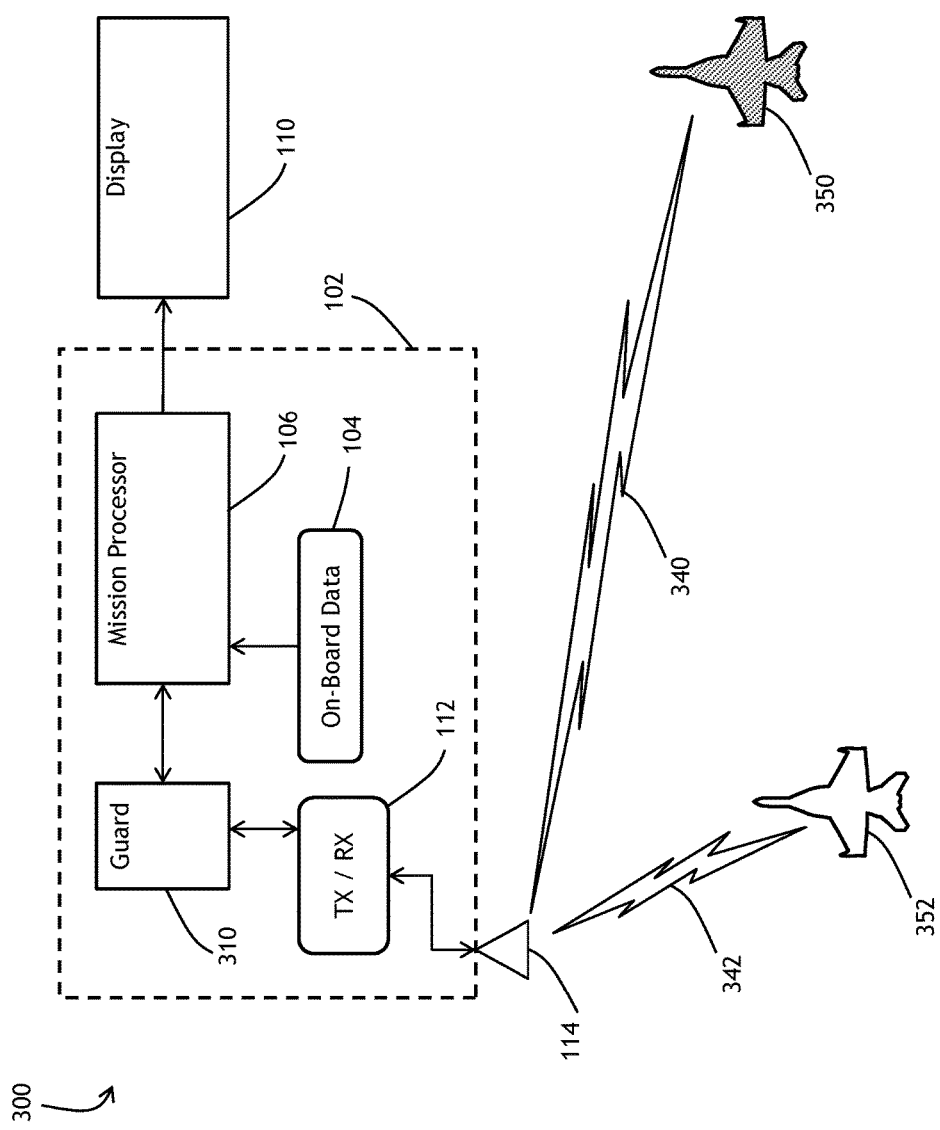
FIG. 3 is a diagram of a system for providing training data in accordance with a preferred embodiment of the present invention.

Referring to FIG. 3, a diagram of a system for providing training data in accordance with a preferred embodiment of the present invention is shown. A system for providing training data may be comprised of data guard 310 incorporated as hardware or software within onboard data network 102.

The system 300 may function to bi-directionally monitor all communications and block a specific data set from transmission and reception between onboard data network 102 and all off-board data networks. During a LVCT exercise, training data (such as simulated radar tracks) broadcast via training datalink 340 may be shared between onboard data network 102 and a training entity 350. Such training data may be merged onto a live aircraft display 110 (MFD). In the event of a catastrophic system failure, it may be possible for data to cross between the training network datalink 340 and the tactical (e.g., Link16) network datalink 342.

For example, classified Link16 data could cross over to a training network monitored by coalition forces maintaining a lesser level of security clearance. Training data, including radar tracks, may inadvertently cross over and be broadcast via Link16 342 to tactical elements 352.

Depending on the architecture, data guard 310 may allow only one-way traffic from the onboard data network 102 to an off-board network. Similarly, data guard 310 may be configured to allow only tactical data to pass through. Preferably, data guard 310 may use a signature-based system to ensure that only valid live entities are transmitted to the tactical network 342.

Figure 4:
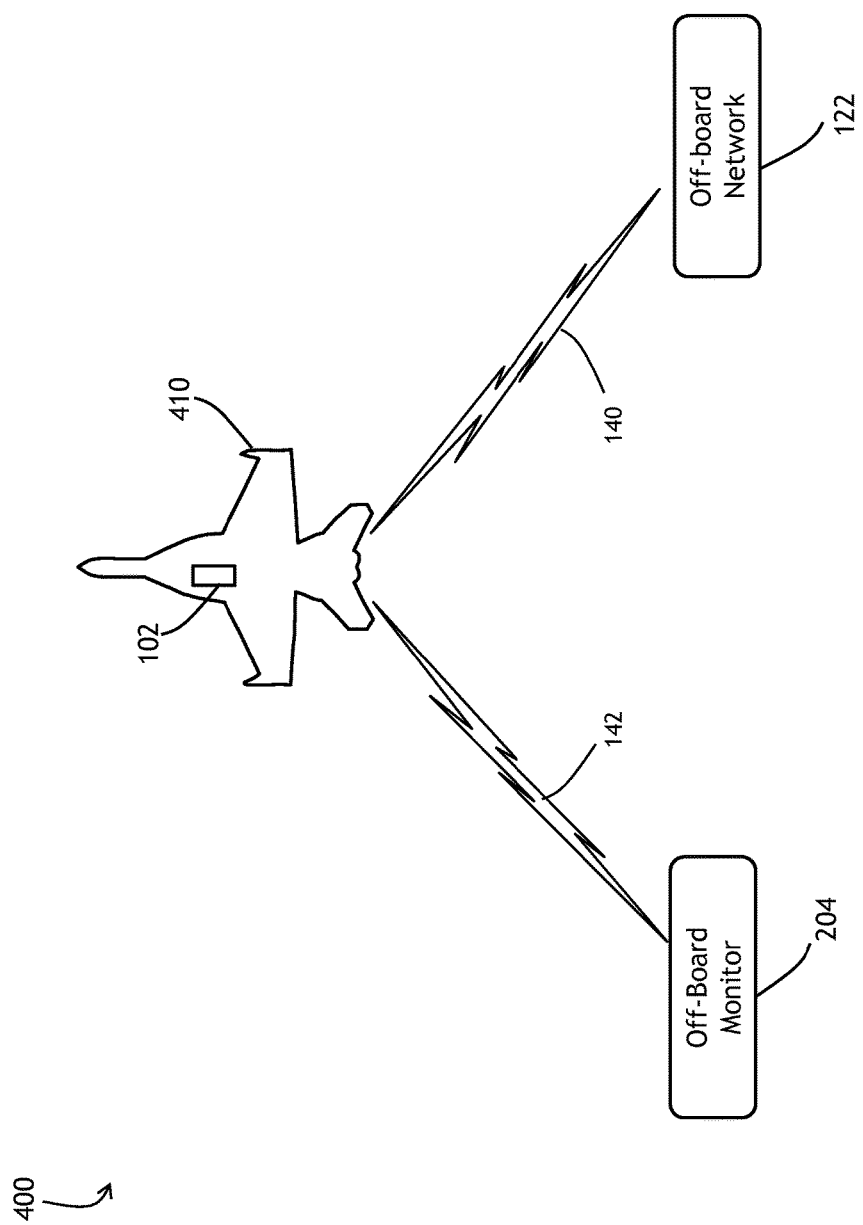
FIG. 4 is a diagram of an operational configuration of a training data network, an off-board monitor, and remote instructor operating an off-board network representative of a preferred embodiment of the present invention.

Referring to FIG. 4, a diagram of an operational configuration of a training data network, an off-board monitor, and remote instructor operating an off-board network representative of a preferred embodiment of the present invention is shown. Onboard data network 102 operational aboard platform 410 may connect with off-board data network 122 via datalink 140 as well as off-board monitor 204 via datalink 142. Onboard data network 102 may comprise data guard 310 as well as onboard monitor 202 to enhance safety and security.

Figure 5:
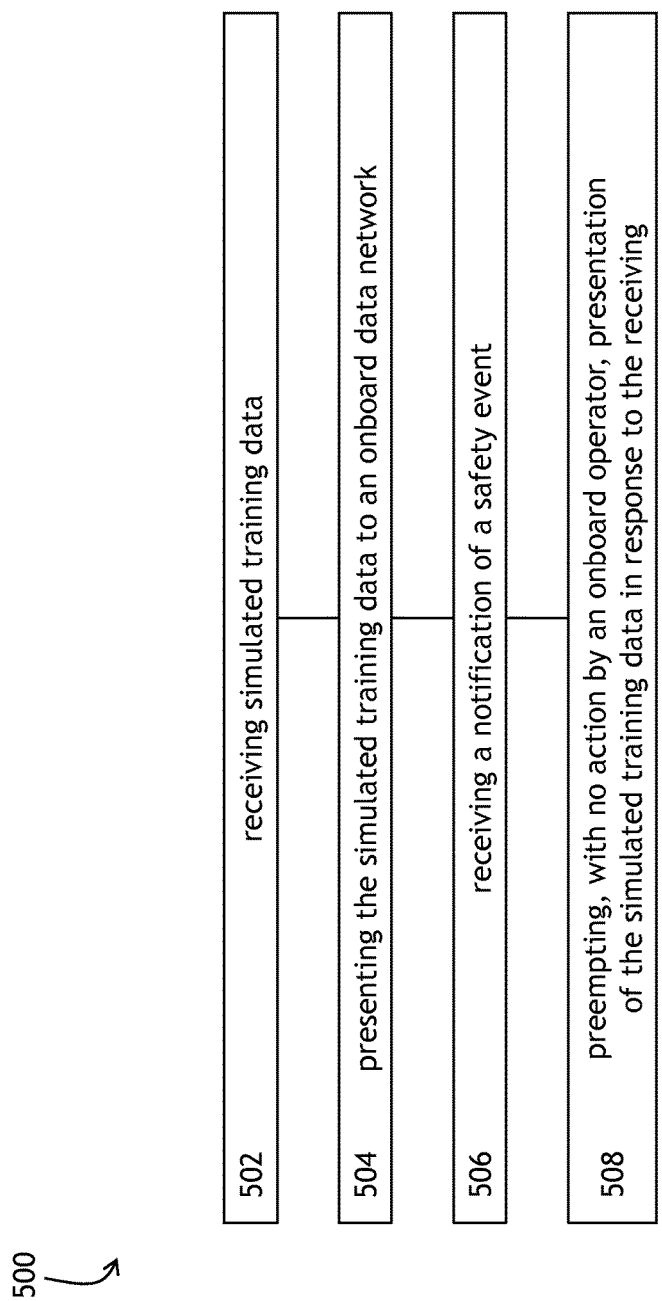
FIG. 5 is a flow diagram of a method for providing training data in accordance with a preferred embodiment of the present invention.

Referring to FIG. 5, a flow diagram of a method for providing training data in accordance with a preferred embodiment of the present invention is shown. Method 500 may, at step 502, receive simulated training data and, at step 504, present the simulated training data to an onboard data network. Method 500 may continue at step 506 with receiving a notification of a safety event and, at step 508, preempt, with no action by an onboard operator, presentation of the simulated training data in response to the receiving.

CONCLUSION

Specific blocks, sections, devices, functions, processes and modules may have been set forth. However, a skilled technologist will realize that there are many ways to partition the method and system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A training data network, comprising:
a first network hardware and software located on a mobile platform and a second network hardware and software located off of the mobile platform;
a first data link to communicate primary operational data off of the mobile platform and to communicate training data including simulated training data onto the mobile platform to present the training data on the mobile platform using the first network hardware and software, said simulated training data being generated by the second network hardware and software and being inhibited from communication or precluded from presentation by a notification of a safety event initiated by a safety monitor, the safety monitor including a first safety monitor located on the mobile platform and a second safety monitor located off of the mobile platform, said first safety monitor configured for monitoring the primary operational data for a malfunction or a critical parameter, said second safety monitor configured for monitoring operational safety; and
a second data link for communicatively coupling the second safety monitor to the first network hardware and software, wherein said second data link or a third data link is configured for communicating a data set including tactical data to the first network hardware and software, said tactical data being blocked from communication to or from the mobile platform by a data guard based on an architecture or a signature associated with the data set.

2. The training data network of claim 1, wherein said first network hardware and software comprises an onboard data network configured to present said primary operational data on a display, the display conforming to a standard display format.

3. The training data network of claim 2, wherein said second network hardware and software comprises an off-board data network configured to transmit said simulated training data for display on the display in the standard display format.

4. The training data network of claim 3, wherein said notification comprises a first notification of a first safety event detectable by the off-board data network, and a second notification of a second safety event detectable by the onboard data network, and wherein said first notification of the first safety event or said second notification of the second safety event precludes display of said simulated training data.

5. The training data network of claim 3, wherein the first data link comprises a first type of data link, the data guard comprises a signature-based onboard data guard, and the second data link comprises a second type of data link,
wherein said signature-based onboard data guard monitors communications between the onboard data network and the off-board data network to block or enable communications between the onboard data network and the off-board data network based on at least one of: the first data link type, the second data link type, a security clearance, a signature associated with communicated data, and a type of the communicated data, wherein the type of communicated data comprises one of classified data, tactical data, simulated training data, and primary operational data.

6. The training data network of claim 1, wherein said mobile platform comprises an aircraft and the malfunction or the critical parameter is associated with at least one of: an engine, control of the aircraft, and a fire on the aircraft.

7. The training data network of claim 1, wherein said primary operational data comprises routine data necessary for an operator to effectively operate a vehicle, the notification of the safety event comprises critical data for the operator to effectively operate the vehicle, the critical data is associated with at least one of the critical parameter, the malfunction, and the operational safety, and wherein said routine data is precluded from presentation when said critical data is detected to more quickly present or utilize the critical data.

8. The training data network of claim 1, wherein said mobile platform further comprises an external pod configured for datalink agility, enabling said mobile platform to interchange between two or more data link requirements.

9. The training data network of claim 1, wherein said notification of the safety event includes two or more of: a visual alert, an auditory alert, an exit from a training mode, and a removal of any training data from a display.

10. A system for providing training data comprising:
a training network comprising a training data generation system and a training data presentation system, the training network communicatively coupled with a platform;
the training data generation system comprising an onboard network located onboard the platform, the onboard network comprising a first processor and a first transceiver configured for obtaining primary operational data from the platform in response to received simulated training data and for transmitting said primary operational data to the training data presentation system;
the training data presentation system comprising an off-board network located off of the platform, the off-board network comprising a second processor and a second transceiver configured for receiving and presenting said primary operational data or a subset of said primary operational data and generating and transmitting training data including said simulated training data;
a safety monitor configured to monitor said primary operational data and provide a notification of a safety event, the safety monitor comprising a first safety monitor located onboard the platform and a second safety monitor located off of the platform; and
a signature-based data guard operably coupled with said onboard network, the data guard configured for preventing at least partial transmission and reception of said simulated training data during the safety event.

11. The system of claim 10, wherein the platform comprises an aircraft and the training data presentation system comprises a first presentation system, the system further comprising:
a second presentation system located onboard the aircraft.

12. The system of claim 11, wherein said primary operational data or the subset of said primary operational data comprises routine data necessary for a pilot to effectively operate the aircraft, said notification of the safety event comprises critical data for the pilot to effectively operate the aircraft, and wherein said routine data is inhibited by the data guard from presentation on at least the second presentation system when said critical data is detected by the onboard data network to more quickly present or utilize said critical data.

13. The system of claim 10, wherein the off-board network comprises a first off-board network, and wherein said data guard is further configured for preventing at least partial transmission and reception of classified data between the onboard network and a second off-board network, wherein the preventing at least partial transmission and reception of said classified data further comprises blocking data based on at least one of: a security classification, a level of criticality, a weapons status, and a level of training.

14. The system of claim 10, wherein said preventing at least partial transmission and reception of said simulated training data during the safety event further comprises permitting said notification of the safety event to penetrate said data guard based on at least one of: a data tag, a time stamp, a location, and a signature associated with the notification.

15. A training data network comprising:
an onboard data network located on a mobile platform and comprising a first processor and a first transceiver configured for obtaining primary operational data from the mobile platform in response to received simulated training data and for transmitting said primary operational data off of the mobile platform;
a signature-based data guard coupled to the onboard data network for monitoring communications to and from the mobile platform and for blocking one or more communications based on an architecture or a signature associated with the one or more communications;
a safety monitor for monitoring said primary operational data and for providing a notification of a safety event, the safety monitor comprising a first safety monitor located onboard the mobile platform and a second safety monitor located off of the mobile platform;
a presentation system configured for presenting said primary operational data or a subset of said primary operational data and said simulated training data and further configured for inhibiting, preempting, or precluding said presenting of said simulated training data during the safety event; and
an off-board data network located off of the mobile platform and comprising a second processor and a second transceiver configured for receiving said primary operational data, generating a view from the platform based on said primary operational data or the subset of said primary operational data, and generating and transmitting training data including said simulated training data.

16. The training data network of claim 15, wherein said mobile platform comprises a vehicle, said presentation system comprises a first presentation system located on the mobile platform and a second presentation system located off of the mobile platform, said primary operational data or the subset of said primary operational data comprises routine data necessary for an operator to effectively operate the vehicle, and said notification of the safety event comprises critical data for the operator to effectively operate the vehicle, and wherein the routine data is inhibited from presentation on at least the first presentation system when the critical data is detected by the onboard data network to more quickly present or utilize the critical data.

17. The training data network of claim 15, wherein the presentation system comprises a first presentation system and a second presentation system, the first presentation system including a first display located onboard the mobile platform and configured according to a display format and the second presentation system including a second display located off of the mobile platform and configured to be compatible with the display format of the first display.

18. The training data network of claim 15, wherein the data guard comprises an onboard data guard and is further configured to monitor all communications between the onboard data network and all off-board data networks and to block the one or more communications between the onboard data network and all of the off-board data networks based on a type of the communicated data, and wherein the type of communicated data is determined by the architecture and comprises one of classified data, tactical data, training data, and operational data.

19. The training data network of claim 15,
wherein the mobile platform comprises an aircraft, the onboard safety monitor monitors systems onboard the aircraft for a malfunction or a critical parameter, and the off-board safety monitor monitors operational safety and comprises a Range Control Office (RCO) or an instructor operating the off-board data network.

20. The training data network of claim 19, wherein the off-board safety monitor is communicatively coupled to the aircraft via a second data link and the aircraft is configured to interchange between the first data link, the second data link, or a third data link based on at least one of: hardware and software requirements, a training scenario, and a training site.

* * * * *